Figure 1:
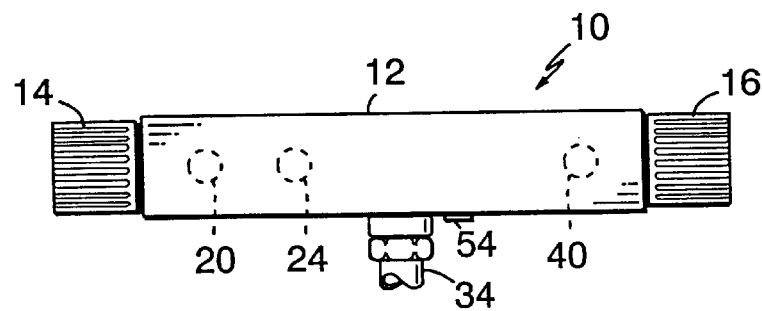

United States Patent [19]
Nutsos

[11] Patent Number: 6,021,803
[45] Date of Patent: Feb. 8, 2000

[54] TAPPING POINT INCLUDING A MIXER FOR COLD AND HOT WATER

[76] Inventor: Mikael Nutsos, Önnemovägen 73, S-146 53, Tullinge, Sweden

[21] Appl. No.: 09/315,173

[22] Filed: May 20, 1999

Related U.S. Application Data

[60] Provisional application No. 60/086,314, May 21, 1998.
[51] Int. Cl.[7] .................................................. F16K 49/00
[52] U.S. Cl. ........................ 137/337; 137/337; 137/563; 137/637.1; 126/362
[58] Field of Search ................................. 137/337, 334, 137/563, 637.1; 126/362

[56] References Cited

U.S. PATENT DOCUMENTS

| | | | |
|---|---|---|---|
| 3,469,598 | 9/1969 | Wigley | 137/334 |
| 4,586,531 | 5/1986 | Lindell | 137/334 |
| 4,606,325 | 8/1986 | Lujan, Jr. | 137/337 |
| 4,688,273 | 8/1987 | Lyng | 137/337 |
| 4,750,472 | 6/1988 | Fazekas | 126/362 |
| 4,759,382 | 7/1988 | Harel | 137/334 |
| 4,870,986 | 10/1989 | Barrett et al. | 137/337 |
| 5,042,524 | 8/1991 | Lund | 137/337 |
| 5,135,021 | 8/1992 | Pegg | 137/337 |
| 5,203,373 | 4/1993 | Austin, Jr. et al. | 137/637.1 |
| 5,323,803 | 6/1994 | Blumenauer | 126/362 |
| 5,351,712 | 10/1994 | Houlihan | 137/337 |
| 5,459,890 | 10/1995 | Jarocki | 126/362 |
| 5,735,291 | 4/1998 | Kaonohi | 137/337 |

*Primary Examiner*—A. Michael Chambers
*Assistant Examiner*—Thomas L. McShane
*Attorney, Agent, or Firm*—Renner, Otto, Boisselle & Sklar, P.L.L.

[57] ABSTRACT

Tapping point including a mixer (10) for cold and hot water where the mixer (10) has a hot water inlet (20) arranged to connect to a feed pipe (64) for hot water, a cold water inlet (40) arranged to connect to a feed pipe (70) for cold water, a mixing chamber (32) for mixing hot water introduced through the hot water inlet (20) with cold water introduced through the cold water inlet (40), a space for hot water (22) between the hot water inlet and the mixing chamber (32), a space for cold water (42) between the cold water inlet (40) and the mixing chamber (32), a mixer outlet (34) for mixed water from the mixing chamber (32), and an initial valve device (30,36,50) arranged so that in an open mixing position, it allows cold water and hot water to enter into the mixing chamber (32) from their respective spaces (22,42) and exit as mixed water from the mixer outlet (34), and, in a closed mixing position, prevents the exit of mixed water from the mixer outlet (34). To impeded the growth of especially legionella bacteria within the mixer, it is among other things suggested that the mixer (10) additionally has a hot water outlet (24) from the hot water space (22) where the hot water outlet (24) is arranged so that in the closed mixing position, it is connected with a return pipe (66) for hot water via a second valve device (26), and, when in this closed mixing position, allows the circulation of hot water through the hot water space (22).

6 Claims, 1 Drawing Sheet

TAPPING POINT INCLUDING A MIXER FOR COLD AND HOT WATER

This application claims benefit to provisional application 60/086314 filed May 21, 1998.

The present invention refers to a tapping point that includes a mixer for cold and hot water where the mixer has a hot water inlet arranged to connect to a feed pipe for hot water, a cold water inlet arranged to connect to a feed pipe for cold water, a mixing chamger for mixing hot water introduced through the hot water inlet with cold water introduced through the cold water inlet, a space for hot water between the hot water inlet and the mixing chamber, a space for cold water between the cold water inlet and the mixing chamber, a mixer outlet for mixed water from the mixing chamber, and an initial valve device arranged so that in the open mixing position, it allows water cold and hot water to enter into the mixing chamber from their respective spaces and allows the exit of mixed water from the mixer outlet, and, in the closed mixing position, prevents the exit of mixed water from the mixer outlet.

One problem of known tapping points is that especially the hot water space and the mixing chamber constitute an environment for the growth of water-borne bacteria, especially the feared legionella bacteria that can, in an ameoba cell, increase in numbers up to 10,000-fold within 48 hours if the water temperature is about 35° C. The legionella bacterium does not circulate in water as a free-living organism, but is part if a very complex micro-environment that is found, for example, on the inside of water tanks, water pipes and mixers. The biofilm, which there consists of micro-organisms, develops a thin layer of slime to protect itself from external influences such as biocides used specifically for the purposes of combating the growth of the micro-organisms. This is a relatively new problem that is supposedly related to the more widespread use of modern thermostatic mixers; older types of mixers do not, in principle, have any spaces that retain hot water that has cooled-down and that is thus able to promote the growth of bacteria. Bacterial growth is considered to cease at temperatures of about 50° C.

Recent attempts to address this problem have included mixers where an operator can use a special tool to temporarily raise the maximum temperature of the thermostat and flush the mixer with scalding hot water for several minutes with the aim of killing the bacteria during a round of all the tapping points in a hospital or care establishment, for example. A computer-controlled automated system for the regular flushing of mixers with hot water has also been suggested. Further experience has shown that one can attain effects when one continuously supplies the water with oxidising biocides such as chlorine, bromine or ozone. When such measures are taken, it is recommended that the bacterial levels be tested regularly at 14 day intervals. However, all such procedures mean a great deal of involvement and consequently costs for the service operator in, for example, a hospital. In addition, the activities in the clinics will be disrupted.

One objective of the present invention is to obtain a tapping point of the type named in the introduction by a new mixer design that solves the problem of bacterial growth in the mixer.

According to one aspect of the invention, the mixer also has a hot water outlet from the hot water space, where the hot water outlet is arranged so that in the closed mixing position, it is joined via other valve device with a return pipe for hot water, and, in this closed mixing position, allows circulation of hot water through the hot water space. By this means of continuously flushing the hot water space with hot water from a central hot water heater that always maintains the water at a temperature over at least 50° C., the growth of bacteria in the hot water space is effectively impeded. Here, hot water space refers to the innermost of the mixer's housings for holding hot water prior to the water reaching the mixing chamber, and that can be defined by the outer dimensions of the mixer, which in turn are partly defined by the standard for the distance between the incoming pipes for hot and cold water. Thermally insulated return pipes for hot water are, in fact, often already installed in the water mains network of, for example, a hospital, whereby in such cases, the return pipes only need to be furnished with branches off to the respective tapping point. To save energy, the mixer's hot water space can also be thermally insulated with, for example, an intermediate space of air.

According to one preferred embodiment of the invention, the mixer chamber includes a drain and ventilation outlet arranged, via a third valve device, to allow drainage and ventilation of the mixer chamber in the closed mixing portion. Thus, in this way, the mixer chamber can be empty and ventilated between the occasions when it is in use so that bacterial growth is also effectively impeded even in the mixer chamber.

According to another embodiment of the invention, it is possible to arrange a similar principal solution at the cold water side of the mixer, i.e., a circulation circuit also for cold incoming water. Thereby it will be guaranteed that also the water at the cold water side of the mixer is not kept immovable for long periods, eliminating the danger of temperature rising to about 37° C. during summer. By means of a an exchanger being cooled by a central cooling system, this circulating cold water can always be kept at temperatures of 15–18°C. with no danger of growth of legionella bacteria.

Further characteristics and advantages of the invention are evident from the claims and the folowing detailed description.

Figure 2:
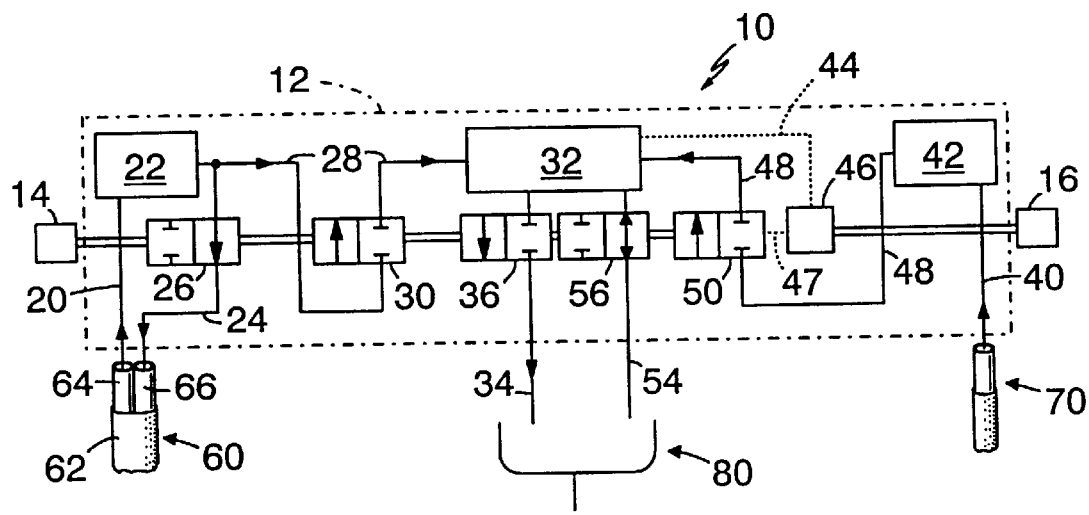

Examples of embodiments of the invention are described more closely as follows with reference to the enclosed drawing where FIG. 1 shows the frontal view of a mixer according to the invention; FIG. 2 shows, as a block diagram, a mixer according to the invention in a closed mixing position; and FIG. 3 shows the mixer according to FIG. 2 in an open mixing position.

The mixer 10 according to the invention shown only as an example in FIG. 1 includes what is in fact a known mixer housing 12 with a hot water inlet 20, a cold water inlet 40 and a mixer outlet 34 leading to a basin, bath or similar 80. The flow and temperature of the water that emerges from the mixer are adjusted by the knobs 14 and 16 respectively.

Figure 3:
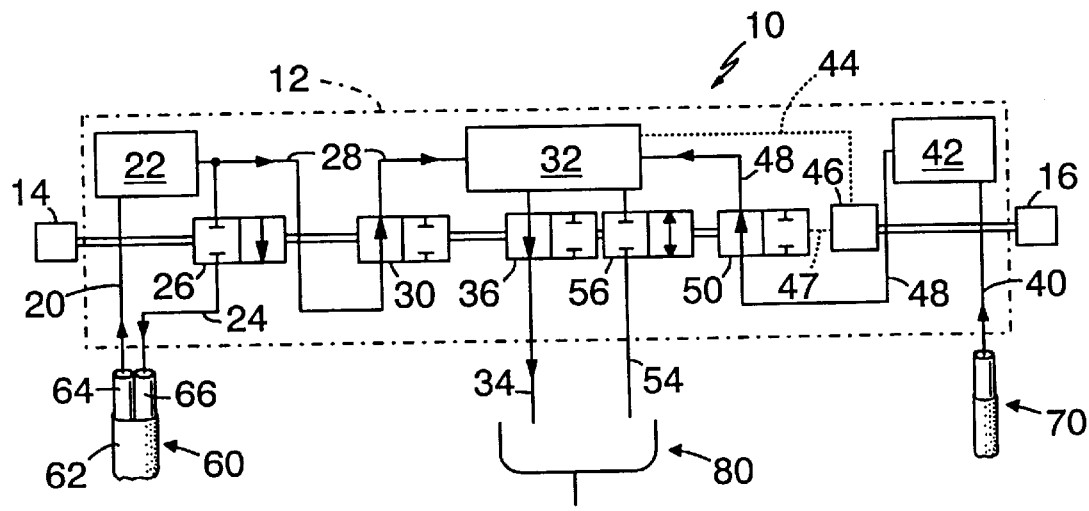

The schematic representations in FIG. 2 and 3 show the principle of the mixer's 10 functional characteristics. When studying these, it should be noted that the execution of a detailed constructive design can vary considerably in accordance with different mixer manufacturer's preferences for detailed solutions, especially with regard to the placement and shape of the mixer's inner chambers, valves, pressure-regulated thermostats and adjusting devices. Nevertheless, it is usual for the spaces 22 and 24 described below together with the mixing chamber 32 to occupy the whole of the mixer housing 12, whereby the valves are positioned at dividing walls between them so that the pipes 20, 24, 28, 48 40 that are arranged within the mixer housing 12 are only short passages or valve openings in the constructive embodiment.

At one end of the mixer housing 12, a hot water inlet 20 opens, via a hot water pipe 64, into a hot water space 22 that can occupy a larger or a smaller portion of the interior of the mixer housing 12. There is a piping passageway 28 and an inlet valve 30 between the hot water space 22 and the mixing chamber 32.

At the other, opposite end of the mixer housing 12, a cold water inlet 40 opens in an equivalent manner, via a cold water pipe 70, into a cold water space 42 that can occupy a larger or a smaller portion of the interior of the mixer housing 12. There is a piping passageway 48 and an inlet valve 50 between the hot water space 42 and the mixing chamber 32.

There is an outlet valve 36 between the mixing chamber 32 and the mixer outlet 34.

The inlet valves 30, 50 and the outlet valve 36 are, as indicated in FIG. 2 and 3, mechanically connected to one another so that they can be adjusted when a user turns knob 14 to open the mixer to the position shown in FIG. 3, or to close the mixer to the position shown in FIG. 2. The temperature of the mixed water that emerges from the mixing chamber 32 is adjusted with the knob 16 that regulates the mutual opening positions of valves 30 and 50 for setting the desired temperature of the mixed water. Knob 16 is additionally connected to a thermostat 46 that is capable of comparing the desired set temperature with the actual temperature via a pipe 44 and that, using feedback via a schematically represented transfer device 47, adjusts the said mutual opening positions in accordance with this desire by what is, in fact, a known mechanism.

According to the invention, the mixer 12 also has a hot water outlet 24 from the hot water space 22. The hot water outlet 24 is arranged to be connected with a return pipe 66 for hot water via an outlet valve 26. As indicated in FIG. 2 and 3, outlet valve 26 is arranged to be adjusted together with other valves by manoeuvring knob 14. Outlet valve 26 is open in the closed mixer position (FIG. 2) and closed in the open mixer position (FIG. 3) for continuous flushing of the hot water space with hot water when the mixer is not in use.

In a mains water network for mixers according to the invention, it can be appropriate that the feed pipe 64 and the return pipe 66 for hot water extend together side-by-side as one unit 60, preferably inside a common and preferably thermally insulated coating 62. This arrangement will simplify installing the pipes and help reduce heat losses. As mentioned earlier, even the hot water space 22 can be thermally insulated by means of a surrounding layer of insulation, e.g. a layer of air (not shown).

Finally, a drainage and ventilation outlet 54 extends from the mixer chamber 32. This is opened and closed by a valve 56, which is manoeuvred together with the other valves by turning knob 14. More specifically, valve 56 is arranged so that it is closed during the open mixing position (FIG. 3) and open during the closed mixing position (FIG. 2). If the mixer has two alternative outlets, such as a conventional pipe and a shower hose, both of these can be drained and ventilated via the outlet 54. To further reduce the risk of bacterial growth in the mixer chamber 32, it can preferably be constructed with a minimal volume.

I claim:

1. A tapping point including a mixer (10) for cold and hot water where the mixer (10) has a hot water inlet (20) arranged to connect to a feed conduit (64) for hot water, a cold water inlet (40) arranged to connect to a feed conduit (70) for cold water, a mixing chamber (32) for mixing hot water introduced through the hot water inlet (20) with cold water introduced through the cold water inlet (40), a space for hot water (22) between the hot water inlet and the mixing chamber (32), a space for cold water (42) between the cold water inlet (40) and the mixing chamber (32), a mixer outlet (34) for mixed water from the mixing chamber (32), and first valve means (30,36,50) arranged so that in an open mixing position, it allows cold water and hot water to enter into the mixing chamber (32) from their respective spaces (22,42) and allows their exit as mixed water from the mixer outlet (34) characterised in that the mixer (10) additionally has a hot water outlet (24) from the hot water space (22), where the hot water outlet (24) is arranged so that in the closed mixer position, it is connected with a return conduit (66) for the hot water via second valve means (26), and in this closed mixer position, allows the circulation of hot water through the hot water space (22).

2. The tapping point according to claim 1 characterised in that said first and second valve means (30,36,50,26) are arranged to be manoeuvred together between the open and closed mixer positions.

3. The tapping point according to claim 1 characterised in that the mixing chamber (32) also includes a drainage and ventilation outlet (54) arranged so that it allows drainage and ventilation of the mixer chamber (32) in the closed mixing position via third valve means (56).

4. The tapping point according to claim 3 characterised in that said first, second and third valve means (30,36,50,26, 56) are arranged to be manoeuvred together between the open and closed mixer positions.

5. The tapping point according to claim 1 characterised in that the mixer chamber (32) is constructed with a minimal volume.

6. The tapping point according to claim 1 characterised in that the feed conduit (64) and the return conduit (66) for hot water extend together side-by-side to the mixer (10), preferably inside a common coating (62).

* * * * *